(12) United States Patent
Shiokawa

(10) Patent No.: US 8,953,229 B2
(45) Date of Patent: Feb. 10, 2015

(54) IMAGING SYSTEM

(71) Applicant: Riso Kagaku Corporation, Tokyo (JP)

(72) Inventor: Mitsuharu Shiokawa, Ibaraki (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 14/191,084

(22) Filed: Feb. 26, 2014

(65) Prior Publication Data

US 2014/0240798 A1 Aug. 28, 2014

(30) Foreign Application Priority Data

Feb. 27, 2013 (JP) ................................. 2013-036826

(51) Int. Cl.
*H04N 1/04* (2006.01)
*H04N 1/024* (2006.01)

(52) U.S. Cl.
CPC ................................ *H04N 1/02418* (2013.01)
USPC ......................................... 358/486; 358/474

(58) Field of Classification Search
CPC ................................................. H04N 1/02418
USPC .................................................. 358/486, 474
See application file for complete search history.

(56) References Cited

U.S. PATENT DOCUMENTS

| | | | |
|---|---|---|---|
| 2006/0112846 A1* | 6/2006 | Aoki et al. ...................... | 101/483 |
| 2007/0103703 A1* | 5/2007 | Matoba .......................... | 358/1.6 |
| 2008/0049263 A1 | 2/2008 | Nakamura et al. | |

FOREIGN PATENT DOCUMENTS

| | | | |
|---|---|---|---|
| JP | H10-285323 | A | 10/1998 |
| JP | 2001-277612 | A | 10/2001 |
| JP | 2002-300353 | A | 10/2002 |
| JP | 2008-054209 | A | 3/2008 |

* cited by examiner

*Primary Examiner* — Douglas Tran
(74) *Attorney, Agent, or Firm* — Studebaker & Brackett PC

(57) ABSTRACT

An image data output unit including an output-side processing section for performing a plurality of processing operations on image data, and an imaging unit including an imaging-side processing section for performing a given processing operation on image data outputted from the image data output unit and an imaging operation section for performing an imaging operation based on the image data outputted from the imaging-side processing section are provided. An amount of data to be transferred per unit time of processed image data that will result when the processing operations are performed on the image data at the output-side processing section is compared with a transferable amount of data transmission per unit time between the image data output unit and the imaging unit, and each of the processing operations is allocated to the output-side processing section or the imaging-side processing section based on the result of the comparison.

7 Claims, 6 Drawing Sheets

FIG. 4

| CASE NO. | MODE | ORIGINAL DOCUMENT SIZE | AMOUNT OF DATA | SCALING FACTOR | AMOUNT OF DATA | COLOR CONVERSION | AMOUNT OF DATA | HALFTONING | AMOUNT OF DATA |
|---|---|---|---|---|---|---|---|---|---|
| 1 | PRINT mode | A4 | 24.9 | 100% (No magnification) | 24.9 | RGBtoCMYK | 33.2 | Each 8-bit pixel data ⇒ 4-bit data | 16.6 |
| 2 | PRINT mode | A4 | 24.9 | 141% (Enlargement) | 35.1 | RGBtoCMYK | 46.8 | Each 8-bit pixel data ⇒ 4-bit data | 23.4 |
| 3 | PRINT mode | A4 | 24.9 | 200% (Enlargement) | 49.8 | RGBtoCMYK | 66.4 | Each 8-bit pixel data ⇒ 4-bit data | 33.2 |
| 4 | PRINT mode | A4 | 24.9 | 200% (Enlargement) | 49.8 | RGBtoMono | 16.6 | Each 8-bit pixel data ⇒ 4-bit data | 8.3 |
| 5 | SAVE mode | A4 | 24.9 | 200% (Enlargement) | 49.8 | — | 49.8 | — | 49.8 |
| 6 | SAVE mode | A4 | 24.9 | 200% (Enlargement) | 49.8 | RGBtoMono | 16.6 | Each 8-bit pixel data ⇒ 1-bit data | 2.08 |
| 7 | PRINT mode | A5 | 12.4 | 100% (No magnification) | 12.4 | RGBtoCMYK | 16.5 | Each 8-bit pixel data ⇒ 4-bit data | 8.27 |
| 8 | PRINT mode | A5 | 12.4 | 141% (Enlargement) | 17.5 | RGBtoCMYK | 23.3 | Each 8-bit pixel data ⇒ 4-bit data | 11.7 |
| 9 | PRINT mode | A5 | 12.4 | 200% (Enlargement) | 24.8 | RGBtoCMYK | 33.1 | Each 8-bit pixel data ⇒ 4-bit data | 16.5 |
| 10 | PRINT mode | A5 | 12.4 | 200% (Enlargement) | 24.8 | RGBtoMono | 8.3 | Each 8-bit pixel data ⇒ 4-bit data | 4.13 |
| 11 | SAVE mode | A5 | 12.4 | 200% (Enlargement) | 24.8 | — | 24.8 | — | 24.8 |
| 12 | SAVE mode | A5 | 12.4 | 200% (Enlargement) | 24.8 | RGBtoMono | 8.3 | Each 8-bit pixel data ⇒ 1-bit data | 1.03 |

IMAGING SYSTEM

BACKGROUND OF THE INVENTION

1. Field of the Invention

The present invention relates to an imaging system that includes an image data output unit for performing a plurality of processing operations to image data and outputting the processed image data, and an imaging unit for performing an imaging operation based on the image data outputted from the image data output unit.

2. Description of the Related Art

Conventionally, various imaging systems that include a document reading unit for photoelectrically reading an original document to generate image data, performing predetermined processing operations on the image data and outputting the processed image data, and an imaging unit for performing an imaging operation based on the image data outputted from the document reading unit are proposed (see, for example, Japanese Unexamined Patent Publication Nos. 2001-277612, 2008-054209, 2002-300353 and H10 (1998)-285323 (hereinafter, Patent Documents 1, 2, 3 and 4, respectively)).

In this type of imaging system, image data is directly outputted from the document reading unit to the imaging unit. Therefore, at the document reading unit, image data outputted from a photoelectric conversion device, such as a CCD sensor (Charge Coupled Device Image Sensor), and subjected to AD conversion is further subjected to various processing operations, such as scaling, color conversion and half toning, to generate image data for printing, and the thus generated image data for printing is outputted to the imaging unit of an inkjet printer, a laser printer, a screen printer, or the like.

SUMMARY OF THE INVENTION

The above-described document reading unit may include a so-called ADF (Auto Document Feeder), which automatically conveys sheets of an original document to sequentially read the sheets of the original document. In recent years, along with increase of the reading speed of the ADF, an amount of data to be transferred per unit time that can be outputted from the document reading unit tends to increase.

On the other hand, the document reading unit and the imaging unit are connected to each other via a USB cable or a network cable, for example, and the transmission speed between the document reading unit and the imaging unit is determined depending on the transmission method or standard used. Depending on the transmission method or standard, the amount of data to be transferred per unit time that can be outputted from the document reading unit may exceed the upper limit of the transmission speed. In such a case, the transmission speed becomes a bottleneck to data transfer and the productivity (reading speed) of the document reading unit may not be maintained. This problem is not limited to the case where image data is transferred from the document reading unit to the imaging unit, but may also arise in a case where image data is transferred from a computer to the imaging unit.

Patent Document 1 proposes a method for preventing processing speed of printing from being influenced by data transfer operation, the method involving: comparing an amount of data of image data before subjected to image processing, such as color processing and n-ary encoding, with an amount of data of the image data after subjected to the image processing; and if the amount of data of the image data before subjected to the image processing is smaller, then outputting the image data before subjected to the image processing to an imaging unit, or if the amount of data of the image data after subjected to the image processing is smaller, then outputting the image data after subjected to the image processing to the imaging unit.

Patent Document 1, however, does not particularly take the transmission speed between the document reading unit and the imaging unit into account. Therefore, with the method of Patent Document 1, image data before subjected to the image processing may be outputted to the imaging unit even when the amount of data to be transferred is within a range allowed by the transmission speed, for example, and this requires a time for performing the image processing at the imaging unit. Thus, the method of Patent Document 1 is not an efficient method.

In view of the above-described circumstances, the present invention is directed to providing an imaging system wherein image data can be efficiently outputted from an image data output unit to an imaging unit without lowering the productivity of the image data output unit, such as a document reading unit, outputting the image data.

An aspect of the imaging system of the invention is an imaging system including: an image data output unit including an output-side processing section for performing a plurality of processing operations on image data; an imaging unit including an imaging-side processing section for performing a given processing operation on image data outputted from the output-side processing section of the image data output unit and an imaging operation section for performing an imaging operation based on image data outputted from the imaging-side processing section; and an image processing allocation section for comparing information of an amount of data to be transferred per unit time of processed image data that will result when the plurality of processing operations are performed on the image data at the output-side processing section with information of a transferable amount of data transmission per unit time between the image data output unit and the imaging unit, and allocating each of the processing operations to the output-side processing section or the imaging-side processing section based on a result of the comparison, wherein the output-side processing section and the imaging-side processing section perform the processing operations allocated thereto by the image processing allocation section.

In the above-described imaging system of the invention, if the amount of data to be transferred per unit time of processed image data is smaller than an upper limit of the transferable amount of data transmission per unit time, the image processing allocation section may allocate all of the processing operations to the output-side processing section, or if the amount of data to be transferred per unit time of processed image data is equal to or greater than the upper limit of the transferable amount of data transmission per unit time, the image processing allocation section may allocate the processing operations between the output-side processing section and the imaging-side processing section.

Further, the image processing allocation section may obtain at least one of information of original document size of the image data, information about color conversion, information about halftoning and information about scaling, and may calculate the information of the amount of data to be transferred per unit time of processed image data based on the obtained information.

Further, the image processing allocation section may obtain, as the information about color conversion or the information about halftoning, information indicating whether the image data is image data of a PRINT mode or image data of a SAVE mode.

Further, the image processing allocation section may obtain, as the information about color conversion, information indicating whether color printing is specified or monochrome printing is specified.

Further, the image data output unit may include: a reading section for photoelectrically reading an original document and outputting the image data; a document platen on which one sheet of the original document to be read is placeable; an automatic document conveyance section on which a plurality of sheets of the original document to be read are placeable, the automatic document conveyance section automatically feeding each sheet of the original document placed thereon; and an original document detection section for detecting whether an original document is placed on the document platen or an original document is placed on the automatic document conveyance section, wherein, if it is detected that an original document is placed on the document platen, the image processing allocation section may allocate all of the processing operations to the output-side processing section, or if it is detected that an original document is placed on the automatic document conveyance section, the image processing allocation section may allocate each of the processing operations to the output-side processing section or the imaging-side processing section based on the result of the comparison between the information of the amount of data to be transferred per unit time of processed image data and the information of the transferable amount of data transmission per unit time.

Further, a processing capacity information obtaining section for obtaining information about processing capacity of the imaging-side processing section may be provided, and the image processing allocation section may allocate the processing operations between the output-side processing section and the imaging-side processing section based on the information about processing capacity.

According to the imaging system of the invention, the information of the amount of data to be transferred per unit time of processed image data that will result when the plurality of processing operations are performed on the image data at the output-side processing section of the image data output unit is compared with the information of the transferable amount of data transmission per unit time between the image data output unit and the imaging unit, and each of the processing operations is allocated to the output-side processing section or the imaging-side processing section based on the result of the comparison. Then, the output-side processing section and the imaging-side processing section perform the processing operations based on the allocation. Therefor, if the amount of data to be transferred per unit time of processed image data is equal to or greater than the transferable amount of data transmission per unit time, for example, all or part of the processing operations may be allocated to the imaging-side processing section, so that the output-side processing section performs only the processing operation (s) within a range allowed by the transmission speed allocated thereto. This allows efficiently performing the above-described plurality of processing operations without lowering the productivity of the image data output unit.

In the case where all of the processing operations are allocated to the output-side processing section if the amount of data to be transferred per unit time of processed image data is smaller than the transferable amount of data transmission per unit time, other operations performed at the imaging unit can be efficiently performed without imposing an extra load of the processing operations on the imaging unit.

Further, in the case where the information about processing capacity of the imaging-side processing section is obtained and each of the processing operations is allocated to the output-side processing section or the imaging-side processing section based on the information about processing capacity, none of the processing operations may be allocated to the imaging-side processing section if, for example, the processing capacity of the imaging-side processing section is not enough, so that other operations performed at the imaging unit can be efficiently performed.

BRIEF DESCRIPTION OF THE DRAWINGS

FIG. 4 is a table showing calculated amounts of data to be transferred per unit time of processed image data.

DESCRIPTION OF THE PREFERRED EMBODIMENTS

Figure 1:
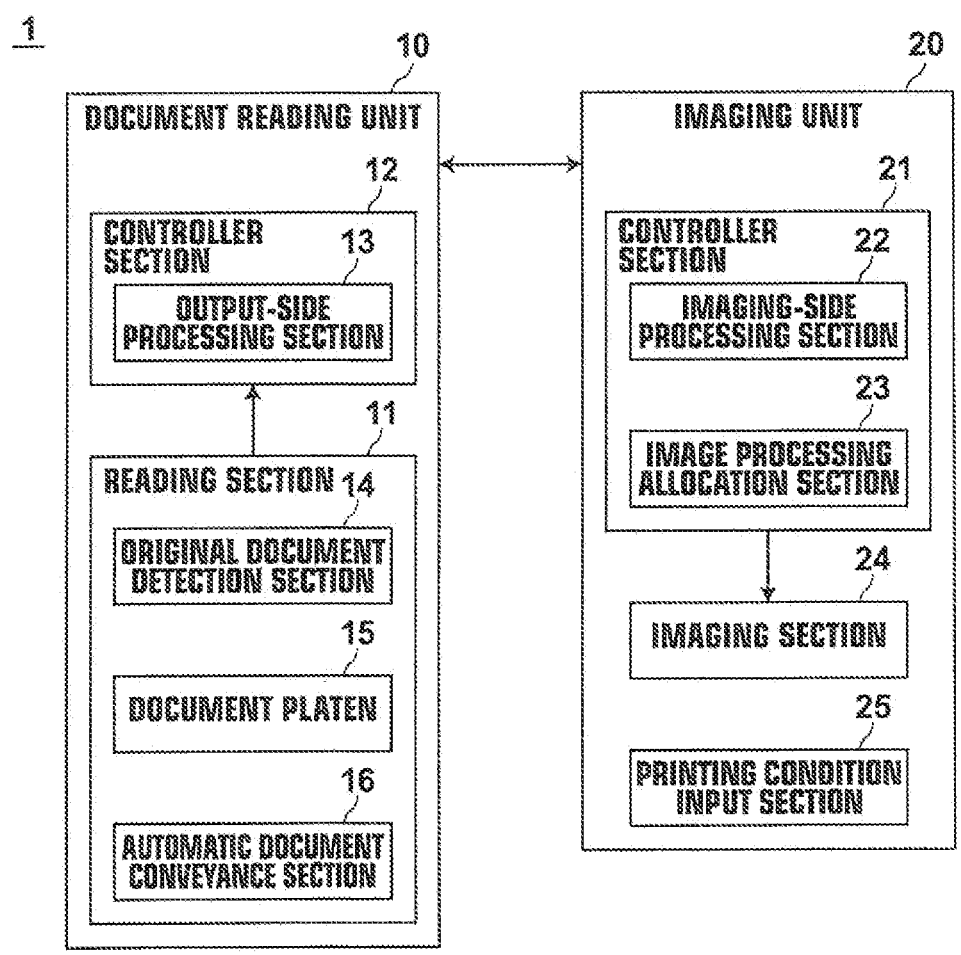
FIG. 1 is a block diagram illustrating the schematic configuration of a printer system employing a first embodiment of an imaging system of the invention.

Hereinafter, a printer system employing a first embodiment of an imaging system of the present invention will be described in detail with reference to the drawings. FIG. 1 is a block diagram illustrating the schematic configuration of a printer system 1 of this embodiment.

As shown in FIG. 1, the printer system 1 of this embodiment includes a document reading unit 10 (which corresponds to an image data output unit of this embodiment), and an imaging unit 20. The document reading unit 10 and the imaging unit 20 are connected to each other via a wired or wireless connection, such as a USB (Universal Serial Bus) cable, a network cable, or a wireless communication line, such as a wireless LAN (Local Area Network).

The document reading unit 10 includes: a reading section 11 for photoelectrically reading an original document and outputting an image signal; and a controller section 12 for controlling the reading section 11 and performing predetermined processing operations on the image signal outputted from the reading section 11.

The reading section 11 includes: a line sensor, such as a CCD sensor, formed by photoelectric conversion devices arranged in the main scanning direction; and an optical system including a light source for applying light to an original document. The line sensor photoelectrically reads an image of the original document while the line sensor and the light source is moved in the sub-scanning direction that is perpendicular to the main scanning direction or the original document is conveyed in the sub-scanning direction. Then, the reading section 11 outputs an image signal of the read original document in the form of R (red), G (green) and B (blue) analog signals of individual pixels.

The reading section 11 also includes a document platen 15, on which one sheet of an original document to be read is placeable, and an automatic document conveyance section 16, on which a plurality of sheets of an original document are placeable, for automatically conveying each sheet of the original document to the document platen 15. The reading section 11 also includes an original document detection section 14 for detecting an original document placed on the document platen 15 or on the automatic document conveyance section 16. The original document detection section 14 includes an optical sensor, etc., for detecting, when an original document is placed on the document platen 15 or on the automatic document conveyance section 16, the presence or absence of the original document and the original document size. The information detected by the original document detection section 14 is outputted to an image processing allocation section 23, which will be described later, of the imaging unit 20 via the controller section 12, and is used to calculate the amount of data of image data of the original document.

The controller section 12 controls the operation of reading the original document at the reading section 11, and includes an output-side processing section 13 for performing a plurality of processing operations on the image signal outputted from the reading section 11. The controller section 12 is formed by a CPU (Central Processing Unit), etc.

Figure 2:
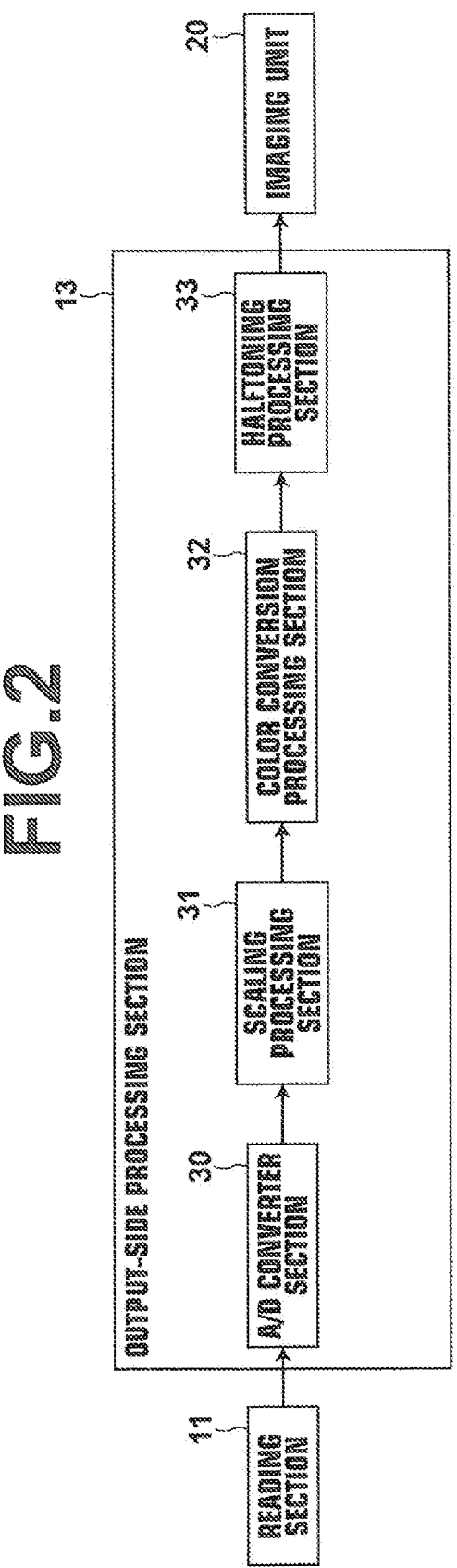
FIG. 2 is a block diagram illustrating a specific configuration of an output-side processing section.
Figure 3:
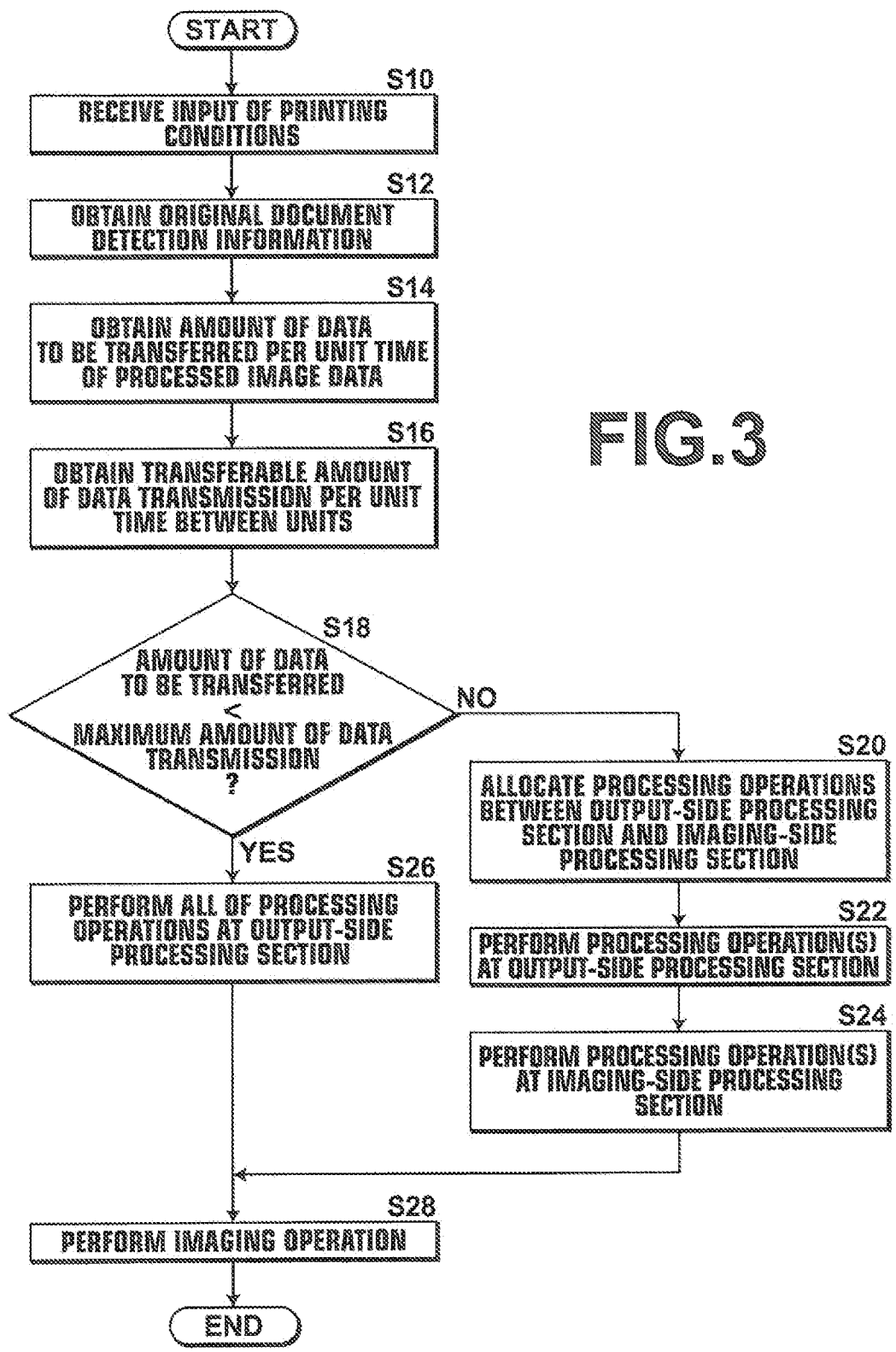
FIG. 3 is a flow chart for explaining operation of the printer system employing the first embodiment of the imaging system of the invention.

FIG. 2 is a block diagram illustrating a detailed configuration of the output-side processing section 13 of the controller section 12. As shown in FIG. 2, the output-side processing section 13 includes an A/D converter section 30, a scaling processing section 31, a color conversion processing section 32 and a halftoning processing section 33. It should be noted that, in this embodiment, only the processing sections where the amount of data of the image data changes before and after processing are described as the configuration of the output-side processing section 13. The output-side processing section 13 actually includes a shading correction section, a gamma correction section, etc., besides the above-mentioned processing sections.

The A/D converter section 30 converts the image signal, which is an analog signal, outputted from the reading section 11 into a digital signal and generates and outputs 8-bit image data for each pixel.

The scaling processing section 31 applies enlargement or reduction processing to the image data outputted from the A/D converter section 30 according to a scaling factor set and inputted by the user. In this embodiment, information of the scaling factor is set and inputted via a printing condition input section 25, which will be described later, of the imaging unit 20. The information of the scaling factor may, for example, be a value of an enlargement factor or a reduction factor, or any other information that indirectly indicates the scaling factor, such as the paper size of a printing paper sheet or imposition information.

The color conversion processing section 32 performs color conversion to convert the RGB image data, which has been subjected to the scaling at the scaling processing section 31, into image data of colors used in a printing operation at the imaging unit 20.

Specifically, for example, in a case where four-color printing of C (cyan), M (magenta), Y (yellow) and K (black) is performed at the imaging unit 20, the color conversion processing section 32 converts the RGB image data of each pixel into CMYK image data. In a case where five-color printing is performed at the imaging unit 20, the color conversion processing section 32 converts the RGB image data of each pixel into image data for five-color printing. In a case where monochrome printing is performed at the imaging unit 20, the color conversion processing section 32 converts the RGB image data of each pixel into black-and-white image data.

Then, the color conversion processing section 32 performs the above-described color conversion based on a printing condition specifying color printing or monochrome printing set and inputted via the printing condition input section 25 of the imaging unit 20.

Further, via the printing condition input section 25, a PRINT mode for immediately performing a printing operation using the image data outputted from the document reading unit 10 or a SAVE mode for once suspending a printing operation and saving the image data without performing a printing operation using the image data outputted from the document reading unit 10 can be set and inputted. If the PRINT mode is set, the color conversion processing section 32 performs color conversion based on the printing condition specifying color printing or monochrome printing. If the SAVE mode is set, the color conversion processing section 32 performs color conversion based on a save condition specifying a color mode or a monochrome binary mode. Specifically, if the save condition specifies the color mode, the color conversion processing section 32 outputs the read RGB image data without performing color conversion. If the save condition specifies the monochrome binary mode, the color conversion processing section 32 converts the RGB image data into black-and-white image data.

The halftoning processing section 33 performs halftoning on the image data that has been subjected to the color conversion at the color conversion processing section 32. As the halftoning, error diffusion is performed in this embodiment. However, any other known processing may be performed. Then, the image data having been subjected to the halftoning is outputted to the imaging unit 20.

The halftoning processing section 33 performs halftoning based on information set and inputted via the printing condition input section 25 of the imaging unit 20. Specifically, if the PRINT mode is set and inputted via the printing condition input section 25, the halftoning processing section 33 performs halftoning regardless of whether color printing or monochrome printing is specified. Specifically, for example, in a case where the imaging unit 20 is configured to perform four-color printing, error diffusion is performed on image data of each of C, M, Y and K colors, and the image data of each color is converted into image data formed by 4-bit pixel data. It should be noted that, in the case of monochrome printing, values of pixel data of C, M and Y colors are zero.

On the other hand, if the SAVE mode is set and inputted via the printing condition input section 25, and if the save condition specifies the color mode, the halftoning processing section 33 outputs the 8-bit pixel data without performing halftoning. On the other hand, if the save condition specifies the monochrome binary mode, the half toning processing section 33 performs halftoning. In this case, the 8-bit pixel data is converted into 1-bit pixel data. That is, only a piece of binarized image data is generated, rather than generating four pieces of image data of C, M, Y and K colors as in the case of the PRINT mode.

Then, the output-side processing section 13 receives a content of processing operations allocated by an image processing allocation section 23, which will be described later, of the imaging unit 20, and performs part or all of the scaling, the color conversion and the halftoning on the image data outputted from the reading section 11 based on the content of processing operations.

Next, the imaging unit 20 is described. As shown in FIG. 1, the imaging unit 20 includes a controller section 21 and an imaging section 24.

The controller section 21 controls a printing operation performed at the imaging section 24, and includes an imaging-side processing section 22, which performs a given processing operation on the image data outputted from the document reading unit 10. The controller section 21 is formed by a CPU (Central Processing Unit), etc.

Specifically, the imaging-side processing section 22 is configured to be capable of performing the same processing operations as those performed at the output-side processing section 13 other than the A/D converter section 30. Then, the imaging-side processing section 22 receives a content of processing operations allocated by the image processing allocation section 23, which will be described later, and performs part or all of the scaling, the color conversion and the halftoning on the image data outputted from the document reading unit 10 based on the content of processing operations.

The image processing allocation section 23 compares information of an amount of data to be transferred per unit time of processed image data that will result after the above-described scaling, color conversion and halftoning are performed on the image data at the output-side processing section 13 with information of a transferable amount of data transmission per unit time between the document reading unit 10 and the imaging unit 20. Then, based on the result of the comparison, the image processing allocation section 23 allocates a part of the above-described scaling, color conversion and halftoning to be the output-side processing section 13 and the other part of the above-described scaling, color conversion and halftoning to the imaging-side processing section 22.

It should be noted that the transferable amount of data transmission per unit time between the document reading unit 10 and the imaging unit 20 is determined by the configuration of hardware that connects between the document reading unit 10 and the imaging unit 20. That is, the document reading unit 10 and the imaging unit 20 are connected to each other via a USB cable, a network cable, a wireless LAN, or the like, as described above, and the above-described transferable amount of data transmission per unit time is determined, for example, according to the transmission method or standard used. It is assumed that a maximum amount of data transmission per unit time according to the transmission method or standard is set in advance at the image processing allocation section 23.

Further, when the document reading unit 10 and the imaging unit 20 are connected to each other via a network cable or a wireless LAN, and if this communication line is also used by other computers and/or imaging units, the maximum amount of data transmission per unit time between the document reading unit 10 and the imaging unit 20 temporally changes. In this case, the image processing allocation section 23 may obtain the temporally-changing maximum amount of data transmission at predetermined time intervals and sequentially update the information to use the information during the above-described comparison. It should be noted that any of various known techniques can be used to obtain the maximum amount of data transmission.

How the amount of data to be transferred per unit time of processed image data is calculated and how the plurality of processing operations are allocated by the image processing allocation section 23 will be described in detail later.

The imaging section 24 performs a printing operation on a printing paper sheet based on the processed image data outputted from the imaging-side processing section 22.

The imaging unit 20 may be an inkjet printer, a laser printer or a screen printer, for example, and the imaging section 24 performs a printing operation of such an apparatus.

The printing condition input section 25 receives input of settings of various printing conditions, and is formed by a touch panel, for example. Examples of the printing conditions set and inputted via the printing condition input section 25 include the condition specifying color printing or monochrome printing, the condition specifying the PRINT mode or the SAVE mode, the condition relating to the scaling factor, etc., described above. When the printing condition input section 25 has received the condition specifying the SAVE mode, the printing condition input section 25 further receives input of setting of the save condition specifying the color mode or the monochrome binary mode.

Next, operation of the printer system 1 of the first embodiment of the invention is described. It should be noted that the printer system 1 of this embodiment is characterized by that the processing operations are allocated between the output-side processing section 13 of the document reading unit 10 and the imaging-side processing section 22 of the imaging unit 20 based on the amount of data to be transferred per unit time of processed image data of an original document and the amount of data transmission per unit time between the document reading unit 10 and the imaging unit 20, and this point is mainly described.

First, after an original document is placed by the user at the reading section 11 of the document reading unit 10, the above-described various printing conditions and save conditions are set and inputted via the printing condition input section 25 of the imaging unit 20 (S10). Then, the set and inputted printing conditions, etc., are inputted to the image processing allocation section 23.

The original document placed at the reading section 11 is detected by the original document detection section 14, and information of the detected original document is also inputted to the image processing allocation section 23 (S12).

Then, based on the printing conditions and save conditions and the information of the detected original document inputted thereto, the image processing allocation section 23 calculates the amount of data of processed image data that will result after the above-described scaling, color conversion and halftoning are applied to the image data of the original document, and calculates the amount of data to be transferred per unit time of processed image data based on the calculated amount of data (S14).

Now, how the amount of data to be transferred per unit time of processed image data is calculated by the image processing allocation section 23 is explained with reference to the table shown in FIG. 4. The table shown in FIG. 4 shows contents of processing operations to be performed on the image data under various printing conditions and reading conditions, and an amount of data of the processed image data after each processing operation included in each content of processing operations. The individual cases shown in FIG. 4 are specifically described below.

Case 1 is a case where printing conditions specifying the PRINT mode, a scaling factor of 100% (no magnification) and color printing are set and inputted, and one sheet of A4-size original document is placed on the document platen 15 or the automatic document conveyance section 16 of the reading section 11.

In the case 1, the information outputted from the original document detection section 14 indicates one sheet of A4-size original document. Therefore, based on this information, the image processing allocation section 23 calculates the maximum amount of data of a sheet of A4-size original document, which is 24.9 MB, and calculates the amount of data of processed image data after the scaling, which is 24.9 MB since the scaling factor is 100% (no magnification). With respect to the color conversion, the amount of data of processed image data is calculated based on the information specifying color printing. Specifically, the RGB image data is converted into to CMYK image data, and the amount of data of processed image data is calculated as follows: 24.9 MB×4/

3=33.2 MB. With respect to the halftoning, the amount of data of processed image data is calculated based on the information specifying the PRINT mode. Namely, in the case of the PRINT mode, each 8-bit pixel data is converted into 4-bit data, as described above, and therefore the final amount of data of processed image data is calculated as follows: 33.2 MB/2=16.6 MB.

Case 2 is a case where printing conditions specifying the PRINT mode, a scaling factor of 141% (enlargement) and color printing are set and inputted, and one sheet of A4-size original document is placed on the document platen 15 or the automatic document conveyance section 16 of the reading section 11.

In the case 2, similarly to the case 1, the information outputted from the original document detection section 14 indicates one sheet of A4-size original document. Therefore, the image processing allocation section 23 calculates the maximum amount of data of a sheet of A4-size original document, which is 24.9 MB, and calculates the amount of data of processed image data after the scaling based on the information of the scaling factor of 141% (enlargement) as follows: 24.9 MB×141%=35.1 MB. With respect to the color conversion, the amount of data of processed image data is calculated based on the information specifying color printing. Specifically, similarly to the case 1, the RGB image data is converted into CMYK data, and the amount of data of processed image data is calculated as follows: 35.1 MB×4/3=46.8 MB. With respect to the halftoning, the amount of data of processed image data is calculated based on the information specifying the PRINT mode. Namely, similarly to the case 1, each 8-bit pixel data is converted into 4-bit data, and therefore the final amount of data of processed image data is calculated as follows: 46.8 MB/2=23.4 MB.

Case 3 is a case where a scaling factor of 200% is set and the other conditions are the same as those in the cases 1 and 2. Therefore, the amount of data after the scaling with the scaling factor of 200% is calculated, which is 49.8 MB. With respect to the other processing operations, the amount of data of processed image after each processing operation is calculated in the same manner as in the cases 1 and 2, and the calculated final amount of data of processed image data is 33.3 MB.

Case 4 is a case where printing conditions specifying a scaling factor of 200% and monochrome printing are set, and the other conditions are the same as those in the cases 1 and 2. Therefore, the amount of data after the scaling with the scaling factor of 200% is calculated, which is 49.8 MB. With respect to the color conversion, based on the information specifying monochrome printing, the RGB image data is converted into monochrome data, and the amount of data of processed image data is calculated as follows: 49.8 MB/3=16.6 MB. With respect to the halftoning, similarly to the cases 1 to 3, each 8-bit pixel data is converted into 4-bit data based on the information specifying the PRINT mode, and therefore the final amount of data of processed image data is calculated as follows: 16.6 MB/2=8.3 MB.

Case 5 is a case where the SAVE mode and the save condition specifying the color mode are set, and a scaling factor of 200% is set. In the case 5, the amount of data after the scaling with the scaling factor of 200% is calculated, which is 49.8 MB. With respect to the color conversion and the halftoning, no processing is performed based on the SAVE mode and the save condition specifying the color mode, and therefore the final amount of data of processed image data is the same as the amount of data after the enlargement (scaling), which is 49.8 MB.

Case 6 is a case where the SAVE mode and the save condition specifying the monochrome binary mode are set, and a scaling factor of 200% is set. In the case 6, the amount of data after the scaling with the scaling factor of 200% is calculated, which is 49.8 MB. With respect to the color conversion, based on the save condition specifying the monochrome binary mode of the SAVE mode, the RGB image data is converted into monochrome data, and the amount of data of processed image data is calculated as follows: 49.8 MB/3=16.6 MB. With respect to the halftoning, based on the SAVE mode and the information of the save condition specifying the monochrome binary mode, the 8-bit pixel data is converted into 1-bit pixel data, and therefore the final amount of data of processed image data is calculated as follows: 16.6 MB/8=2.08 MB.

Cases 7 to 12 differ from the cases 1 to 6, respectively, only in that the original document size detected by the original document detection section 14 is "A5" and therefore the amount of data of unprocessed image data is 12.4 MB. The amount of data of processed image data after each processing operation is calculated in the same manner as in the cases 1 to 6, and therefore detailed descriptions of the cases 7 to 12 are omitted.

Using the final amount of data of processed image data calculated as described above, the image processing allocation section 23 calculates the amount of data to be transferred per unit time that allows maintaining the productivity of the document reading unit 10. Specifically, for example, in a case where the productivity (reading speed) of the document reading unit 10 is 60 pages/minute (60 seconds), the productivity of the document reading unit 10 can be maintained by transferring image data of one page in one second. Therefore, as the amount of data to be transferred per unit time, the final amount of data of processed image data shown in the table of FIG. 4 is calculated. In a case where the productivity of the document reading unit 10 is 100 pages/minute (60 seconds), the amount of data to be transferred per unit time in the case 1, for example, is calculated as follows: 16.6 MB×100 pages/60 seconds=27.7 MB. It is assumed that the productivity (reading speed) of the document reading unit 10 is set in advance.

Subsequently, the image processing allocation section 23 obtains the maximum amount of data transmission per unit time between the document reading unit 10 and the imaging unit 20 (S16). The maximum amount of data transmission per unit time is as described above.

Then, the image processing allocation section 23 compares the amount of data to be transferred per unit time of processed image data that is calculated based on the printing conditions and the save conditions with the maximum amount of data transmission per unit time (S18), and sets, based on the result of the comparison, a content of processing operations allocated to the output-side processing section 13 and a content of processing operations allocated to the imaging-side processing section 22. How the processing operations are allocated in each of the cases shown in the table of FIG. 4 is described below. It is assumed here that the productivity of the document reading unit 10 is 60 pages/minute and the maximum amount of data transmission per unit time is 30 MB/s.

In the cases 1, 2, 4, 6 and 7 to 12, the amount of data to be transferred per unit time of processed image data is smaller than the maximum amount of data transmission per unit time of 30 MB/s (S18, YES). Therefore, the processed image data can be transferred to the imaging unit 20 without lowering the productivity of the document reading unit 10 even when all of the scaling, the color conversion and the halftoning are performed at the output-side processing section 13. Therefore, the image processing allocation section 23 allocates the processing operations such that all of the scaling, the color conversion and the halftoning are performed at the output-side processing section 13.

On the other hand, in the case 3, the amount of data to be transferred per unit time of processed image data is 33.2 MB, which is greater than the maximum amount of data transmission per unit time of 30 MB/s (S18, NO). According to the amount of data of processed image data after each processing operation in the case 3, the amount of data of the image data before the scaling is 24.9 MB, which is smaller than the maximum amount of data transmission of 30 MB/s.

Therefore, the image processing allocation section 23 allocates the processing operations such that all of the scaling, the color conversion and the halftoning are performed at the imaging-side processing section 22, and none of these processing operations are performed at the output-side processing section 13 (S20).

In the case 5, the amount of data to be transferred per unit time of processed image data is 49.8 MB, which is greater than the maximum amount of data transmission per unit time of 30 MB/s (S18, NO). According to the amount of data of processed image data after each processing operation in the case 5, the amount of data of the image data before the scaling is 24.9 MB, which is smaller than the maximum amount of data transmission of 30 MB/s.

Therefore, the image processing allocation section 23 allocates the processing operations such that all of the scaling, the color conversion and the halftoning are performed at the imaging-side processing section 22, and none of these processing operations are performed at the output-side processing section 13 (S20).

It should be noted that, although the processing operations are allocated in the cases 3 and 5 shown in the table of FIG. 4 such that all of the scaling, the color conversion and the halftoning are performed at the imaging-side processing section 22, in a case where the scaling factor is a reduction factor, for example, the amount of data of the image data after the scaling (reduction) is smaller than maximum amount of data transmission per unit time and may even be the smallest, even when the amount of data to be transferred per unit time calculated for the final amount of data of processed image data is greater than the maximum amount of data transmission per unit time.

Specifically, for example, in a case where the imaging unit 20 performs eight-color printing and each pixel data of each color after the halftoning is 5-bit data, and if a scaling factor of 86% is set for the scaling, the amount of data after the scaling is: 24.9 MB×0.86=21.4 MB. Then, the amount of data after the color conversion is: 21.4 MB×8/3=57.1 MB, and the amount of data after the halftoning is: 57.1 MB×5/8=35.7 MB. That is, the amount of data after the scaling is smaller than the maximum amount of data transmission per unit time and is the smallest, as described above. Therefore, in such a case, the image processing allocation section 23 allocates the scaling to the output-side processing section 13 and allocates the color conversion and the halftoning to the imaging-side processing section 22. Therefore, the allocation of the processing operations between the output-side processing section 13 and the imaging-side processing section 22 varies depending on the number of colors in the color conversion, the number of tones in the halftoning, and the scaling factor.

Subsequently, an instruction to start reading of the original document is inputted by the user. In response to the instruction, the reading section 11 reads the original document, and the image data obtained by the reading is inputted to the output-side processing section 13. Then, the output-side processing section 13 performs the processing operations on the image data according to the content of processing operations allocated by the image processing allocation section 23, and outputs the processed image data to the imaging unit 20.

Specifically, if it is determined in S18 that the amount of data to be transferred per unit time of processed image data is smaller than the maximum amount of data transmission per unit time, the output-side processing section 13 performs all of the scaling, the color conversion and the halftoning on the image data, and outputs the processed image data to the imaging unit 20 (S26).

Then, the processed image data inputted to the imaging unit 20 is inputted to the imaging-side processing section 22. Since the processed image data has already been subjected to the scaling, the color conversion and the halftoning, the imaging-side processing section 22 outputs the processed image data to the imaging section 24 without performing these processing operations. The imaging section 24 performs an imaging operation on a printing paper sheet (s) based on the processed image data inputted thereto (S28).

On the other hand, if it is determined in S18 that the amount of data to be transferred per unit time of processed image data is equal to or greater than the maximum amount of data transmission per unit time, the output-side processing section 13 outputs the unprocessed image data to the imaging unit 20 without performing the scaling, the color conversion and the halftoning, or performs part of the scaling, the color conversion and the halftoning on the image data and outputs the processed image data to the imaging unit 20 (S22).

The imaging unit 20 receives the unprocessed image data or partially-processed image data inputted thereto, and the imaging-side processing section 22 processes the image data according to the content of processing operations allocated by the image processing allocation section 23 (S24). Specifically, when all of the scaling, the color conversion and the halftoning are allocated to the imaging-side processing section 22, the imaging-side processing section 22 performs these processing operations and outputs the processed image data to the imaging section 24. On the other hand, if a remaining part of the color conversion and the halftoning that has not been performed at the output-side processing section 13 is allocated to the imaging-side processing section 22, the imaging-side processing section 22 performs the remaining part of these processing operations and outputs the processed image data to the imaging section 24.

Then, the imaging section 24 performs an imaging operation on a printing paper sheet (s) based on the processed image data inputted thereto (S28).

According to the above-described printer system 1 of the first embodiment, if the amount of data to be transferred per unit time of processed image data is equal to or greater than the transferable amount of data transmission per unit time, all or part of the plurality of processing operations are allocated to the imaging-side processing section 22. This allows allocating the processing operations within a range allowed by the transmission speed to the output-side processing section 13, thereby efficiently performing the plurality of processing operations without lowering the productivity of the document reading unit. On the other hand, if the amount of data to be transferred per unit time of processed image data is smaller than the transferable amount of data transmission per unit time, the plurality of processing operations are performed at the output-side processing section 13, so that other operations performed at the imaging unit 20 can be efficiently performed without imposing an extra load of the processing operations on the imaging unit 20.

Further, in the above-described printer system 1 of the first embodiment, the original document detection section 14 may determine whether an original document is placed on the document platen 15 or on the automatic document conveyance section 16, and the image processing allocation section 23 may allocate the processing operations between the output-side processing section 13 and the imaging-side processing section 22 depending on the result of the determination.

Namely, when an original document is placed on the document platen 15, the number of sheets of the original document to be read is one. Therefore, in most cases, the amount of data to be transferred per unit time of processed image data is smaller than the maximum amount of data transmission per unit time. Even if the amount of data to be transferred per unit time of processed image data is equal to or greater than the maximum amount of data transmission per unit time, influence on the productivity of the document reading unit 10 is small. Therefore, when it is detected by the original document detection section 14 that an original document is placed on the document platen 15, the image processing allocation section 23 may allocate all of the scaling, the color conversion and the halftoning to the output-side processing section 13 regardless of the relationship between the amount of data to be transferred per unit time of processed image data and the maximum amount of data transmission per unit time.

On the other hand, when it is detected by the original document detection section 14 that an original document is placed on the automatic document conveyance section 16, the image processing allocation section 23 may allocate the processing operations between the output-side processing section 13 and the imaging-side processing section 22 based on the relationship between the amount of data to be transferred per unit time of processed image data and the maximum amount of data transmission per unit time, as described above.

Figure 5:
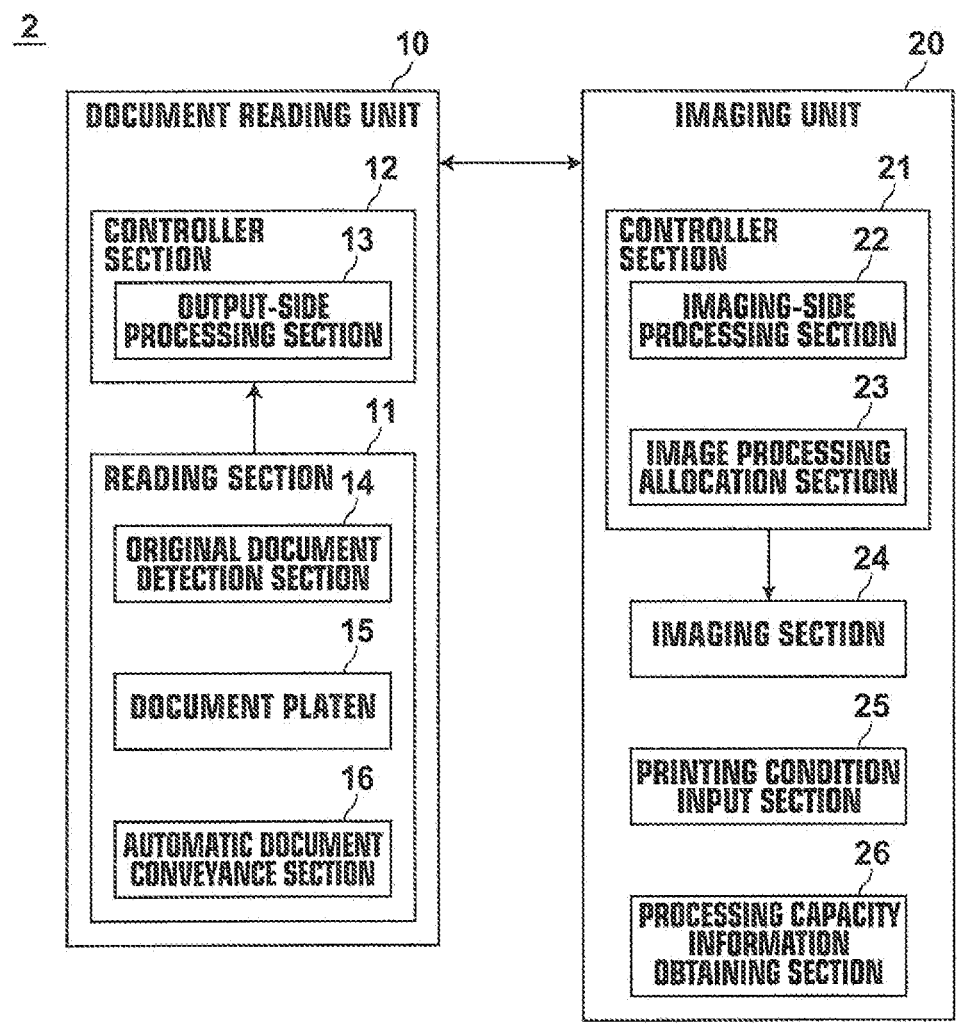
FIG. 5 is a block diagram illustrating the schematic configuration of a printer system employing a second embodiment of the imaging system of the invention.

Next, a printer system employing a second embodiment of the imaging system of the invention is described in detail. FIG. 5 is a block diagram illustrating the schematic configuration of a printer system 2 of this embodiment.

In the printer system 1 of the first embodiment, if it is determined that the amount of data to be transferred per unit time of processed image data is equal to or greater than the maximum amount of data transmission per unit time, all or part of the scaling, the color conversion and the halftoning is performed at the imaging-side processing section 22. However, in this case, if the controller section 21 including the imaging-side processing section 22 of the imaging unit 20 has a low processing capacity as hardware, or if the controller section 21 is already performing a printing operation of a large amount of image data or is processing image data received from a computer, or the like, other than the document reading unit 10 and the controller section 21 is already loaded, for example, the processing capacity of the imaging-side processing section 22 is not enough to perform the extra processing operations, rather resulting in lower processing speed and lower productivity.

In order to prevent the lowering of the productivity of the imaging unit 20, as described above, the printer system 2 of the second embodiment is configured such that, if the controller section 21 of the imaging unit 20 has a low processing capacity as hardware or the controller section 21 is already heavily loaded, all of the scaling, the color conversion and the halftoning are performed at the output-side processing section 13 even when it is determined that the amount of data to be transferred per unit time of processed image data is equal to or greater than the maximum amount of data transmission per unit time.

Specifically, as shown in FIG. 5, the printer system 2 of the second embodiment includes a processing capacity information obtaining section 26 in the imaging unit 20. The processing capacity information obtaining section 26 obtains information about the processing capacity of the imaging-side processing section 22 of the imaging unit 20. The processing capacity information obtaining section 26 obtains information about a current processing capacity of the controller section 21, such as the processing capacity as hardware of a CPU forming the controller section 21 and a load of process operation currently performed by the controller section 21, and outputs this information as the information about processing capacity of the imaging-side processing section 22 to the image processing allocation section 23. If a printing operation is currently preformed by the imaging unit 20, the load of process operation includes, for example, a load of control of operations of various mechanisms involved in the printing operation, a load of processing print job data outputted from a computer to the imaging unit 20, etc. The load of process operation may be calculated with taking not only CPU occupancy but also memory usage, etc., into account.

Then, the image processing allocation section 23 allocates the processing operations to the imaging-side processing section 22 based on the information about processing capacity of the imaging-side processing section 22. Specifically, if the processing capacity is lower than a predetermined level, for example, the image processing allocation section 23 allocates no processing operation to the imaging-side processing section 22, and allocates all of the scaling, the color conversion and the halftoning to the output-side processing section 13. It should be noted that, depending on the level of the processing capacity, part of the processing operations may be allocated to the output-side processing section 13.

The other features and operations are the same as those of the above-described printer system 1 employing the first embodiment.

Figure 6:
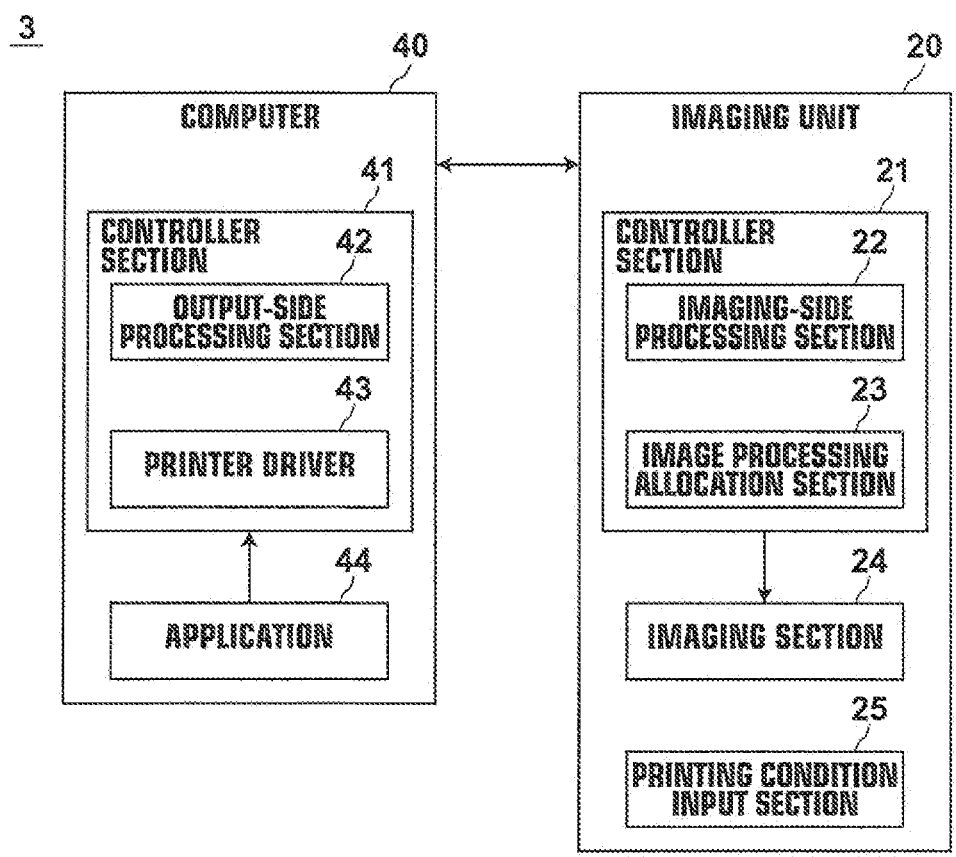
FIG. 6 is a block diagram illustrating the schematic configuration of a printer system employing a third embodiment of the imaging system of the invention.

Next, a printer system employing a third embodiment of the imaging system of the invention is described in detail. FIG. 6 is a block diagram illustrating the schematic configuration of a printer system 3 of this embodiment.

In the above-described printer systems 1 and 2 of the first and second embodiments, the imaging unit 20 performs a printing operation based on the image data outputted from the document reading unit 10. In the printer system 3 of the third embodiment, the imaging unit 20 performs a printing operation based on image data outputted from a computer 40 (which corresponds to the image data output unit in this embodiment).

The allocation of the processing operations by the image processing allocation section 23 of the printer system 3 of the third embodiment is performed basically in the same manner as in the first and second embodiments.

As shown in FIG. 6, the computer 40 of the printer system 3 of the third embodiment includes a controller section 41 and an application 44.

The application 44 is a program, such as memo pad or Word, capable of generating image data representing an original document. Image data generated with the application 44 is outputted to an output-side processing section 42. The configuration of the output-side processing section 42 is the same as that of the output-side processing section 13 of the first and second embodiments.

The controller section 41 of the computer 40 includes a printer driver 43. In the printer system 3 of the third embodiment, the original document size, the printing conditions, the save conditions, etc., described above are set via the printer driver 43, and information of these settings is outputted to the image processing allocation section 23 of the imaging unit 20. Then, the image processing allocation section 23 calculates the amount of data to be transferred per unit time of processed image data based on the information outputted from the printer driver 43 in the same manner as in the first and second embodiments. It should be noted that, in the third embodiment, an output speed of processed image data from the printer driver 43, which is equivalent to the reading speed of the document reading unit 10 in the first and second embodiments, is set in advance, and the amount of data to be transferred per unit time of processed image data is calculated based on this output speed.

Then, similarly to the first and second embodiments, the image processing allocation section 23 in the printer system 3 of the third embodiment compares the amount of data to be transferred per unit time of processed image data with the maximum amount of data transmission per unit time, and sets, based on the result of the comparison, a content of processing operations to be performed at the output-side processing section 42 of the computer 40 and a content of processing operations to be performed at the imaging-side processing section 22 of the imaging unit 20.

Then, image data outputted from the output-side processing section 42 is converted into PDL (Page Description Language) data by the printer driver 43, and the PDL data is outputted to the imaging unit 20.

At the imaging unit 20, the inputted PDL data is developed. Then, the processing operations are performed at the imaging-side processing section 22 based on the content of processing operations set by the image processing allocation section 23, and the imaging section 24 performs an imaging operation based on the processed image data. It should be noted that, while the PDL data is outputted from the computer 40 to the imaging unit 20 in the above description, bitmap data may be outputted to the imaging unit 20 without converting the data into PDL data.

Further, while each 8-bit pixel data is converted into 4-bit pixel data for each of C, M, Y and K colors during the halftoning in the above-described printer systems 1 to 3 of the first to third embodiments, this is not intended to limit the invention. For example, in a case where the imaging unit 20 is an inkjet printer and the print tones can be changed by changing the number of ink drops, the number of bits of the pixel data of each color may be changed depending on the number of print tones. For example, if the number of print tones is four, each 8-bit pixel data is converted into 2-bit pixel data. If the number of print tones is eight, each 8-bit pixel data is converted into 3-bit pixel data. If the number of print tones is 32, each 8-bit pixel data is converted into 5-bit pixel data. When the number of bits of the pixel data is changed, the amount of data of the processed image data after the halftoning changes. It should be noted that information of the number of print tones is also set and inputted via the printing condition input section 25 or the printer driver 43.

Further, in the above-described printer systems 1 to 3 of the first to third embodiments, the processing operations are allocated between the output-side processing section 13 or 42 and the imaging-side processing section 22 according to the contents of processing operations set by the image processing allocation section 23. The setting where all or part of the processing operations is not performed at the output-side processing section 13 or 42 or the imaging-side processing section 22 may be achieved, for example, by a hardware approach including switching a circuit for performing each processing operation using a switch, or the like, or turning on or off a power supply to the circuit for performing each processing operation. Alternatively, a software control may be used to achieve the switching.

What is claimed is:

1. An imaging system comprising:
   an image data output unit including an output-side processing section for performing a plurality of processing operations on image data;
   an imaging unit including an imaging-side processing section for performing a given processing operation on image data outputted from the output-side processing section of the image data output unit and an imaging operation section for performing an imaging operation based on image data outputted from the imaging-side processing section; and
   an image processing allocation section for comparing information of an amount of data to be transferred per unit time of processed image data that will result when the plurality of processing operations are performed on the image data at the output-side processing section with information of a transferable amount of data transmission per unit time between the image data output unit and the imaging unit, and allocating each of the processing operations to the output-side processing section or the imaging-side processing section based on a result of the comparison,
   wherein the output-side processing section and the imaging-side processing section perform the processing operations allocated thereto by the image processing allocation section.

2. The imaging system as claimed in claim 1, wherein, if the amount of data to be transferred per unit time of processed image data is smaller than an upper limit of the transferable amount of data transmission per unit time, the image processing allocation section allocates all of the processing operations to the output-side processing section, or if the amount of data to be transferred per unit time of processed image data is equal to or greater than the upper limit of the transferable amount of data transmission per unit time, the image processing allocation section allocates the processing operations between the output-side processing section and the imaging-side processing section.

3. The imaging system as claimed in claim 1, wherein the image processing allocation section obtains at least one of information of original document size of the image data, information about color conversion, information about halftoning and information about scaling, and calculates the information of the amount of data to be transferred per unit time of processed image data based on the obtained information.

4. The imaging system as claimed in claim 3, wherein the image processing allocation section obtains, as the information about color conversion or the information about halftoning, information indicating whether the image data is image data of a PRINT mode or image data of a SAVE mode.

5. The imaging system as claimed in claim 3, wherein the image processing allocation section obtains, as the information about color conversion, information indicating whether color printing is specified or monochrome printing is specified.

6. The imaging system as claimed in claim 1, wherein the image data output unit comprises:
   a reading section for photoelectrically reading an original document and outputting the image data;
   a document platen on which one sheet of the original document to be read is placeable;
   an automatic document conveyance section on which a plurality of sheets of the original document to be read are placeable, the automatic document conveyance section automatically feeding each sheet of the original document placed thereon; and an original document detection section for detecting whether an original document is placed on the document platen or an original document is placed on the automatic document conveyance section, wherein, if it is detected that an original document is placed on the document platen, the image processing allocation section allocates all of the processing operations to the output-side processing section, or if it is detected that an original document is placed on the automatic document conveyance section, the image processing allocation section allocates each of the processing operations to the output-side processing section or the imaging-side processing section based on the result of the comparison between the information of the amount of data to be transferred per unit time of processed image data and the information of the transferable amount of data transmission per unit time.

7. The imaging system as claimed in claim 1, further comprising a processing capacity information obtaining section for obtaining information about processing capacity of the imaging-side processing section, wherein the image processing allocation section allocates the processing operations between the output-side processing section and the imaging-side processing section based on the information about processing capacity.

* * * * *